United States Patent
Chin et al.

(10) Patent No.: US 8,804,497 B2
(45) Date of Patent: Aug. 12, 2014

(54) METHOD AND APPARATUS FOR RECOVERY OF LINK FAILURE DURING HANDOVER IN TD-SCDMA SYSTEMS

(75) Inventors: Tom Chin, San Diego, CA (US); Guangming Shi, San Diego, CA (US); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 78 days.

(21) Appl. No.: 13/318,765

(22) PCT Filed: May 8, 2010

(86) PCT No.: PCT/US2010/034156
§ 371 (c)(1),
(2), (4) Date: Nov. 3, 2011

(87) PCT Pub. No.: WO2011/040991
PCT Pub. Date: Apr. 7, 2011

(65) Prior Publication Data
US 2012/0176891 A1    Jul. 12, 2012

Related U.S. Application Data

(60) Provisional application No. 61/246,822, filed on Sep. 29, 2009.

(51) Int. Cl.
*H04W 36/24*    (2009.01)

(52) U.S. Cl.
USPC .......................................... 370/221

(58) Field of Classification Search
CPC ... H04W 80/04; H04W 36/18; H04W 36/001; H04W 36/14; H04W 36/08; H04W 36/0011; H04W 36/0055; H04W 92/20
USPC ......................... 370/221, 328–331
See application file for complete search history.

(56) References Cited

U.S. PATENT DOCUMENTS

2007/0149196 A1*  6/2007  Choi et al. ................ 455/436
2007/0293224 A1* 12/2007  Wang et al. ............... 455/436

(Continued)

FOREIGN PATENT DOCUMENTS

WO    WO0172081 A1    9/2001
WO    WO2007149509 A2    12/2007

(Continued)

OTHER PUBLICATIONS

International Search Report and Written Opinion—PCT/US2010/034156, International Search Authority—European Patent Office—Sep. 9, 2010.

(Continued)

*Primary Examiner* — Jae Y Lee
*Assistant Examiner* — Jean F Voltaire
(74) *Attorney, Agent, or Firm* — Kristine U. Ekwueme (57) ABSTRACT

A method and an apparatus for wireless communications comprising determining that a first handover from a source cell to a target cell has failed; and performing a second handover from the source cell to a first neighbor cell different from the source cell and from the target cell. In on aspect, the method and apparatus further comprising performing the second handover by sending a signal to the first neighbor cell and receiving a return signal from the first neighbor cell; and further comprising sending a message to initiate radio resource setup between the first neighbor cell and a radio network controller (RNC); and receiving a connection resetup and a Physical Channel Reconfiguration message from the radio network controller (RNC).

28 Claims, 8 Drawing Sheets

(56) References Cited

U.S. PATENT DOCUMENTS

2008/0267131 A1* 10/2008 Kangude et al. .............. 370/331
2009/0122730 A1* 5/2009 Yang et al. ................... 370/280

FOREIGN PATENT DOCUMENTS

WO    WO2008024064 A2    2/2008
WO    WO2008042906       4/2008
WO    WO2010033307 A1    3/2010

OTHER PUBLICATIONS

Taiwan Search Report—TW099115316—TIPO—Aug. 5, 2013.

* cited by examiner

METHOD AND APPARATUS FOR RECOVERY OF LINK FAILURE DURING HANDOVER IN TD-SCDMA SYSTEMS

CROSS-REFERENCE TO RELATED APPLICATION(S)

This application claims the benefit of U.S. Provisional Patent Application No. 61/246,822, entitled "APPARATUS AND METHOD FOR RECOVERY OF LINK FAILURE DURING HANDOVER IN TD-SCDMA SYSTEMS", filed on Sep. 29, 2009, which is expressly incorporated by reference herein in its entirety.

BACKGROUND

1. Field

Aspects of the present disclosure relate generally to wireless communication systems, and more particularly, to recovery of link failure during handover in Time Division Synchronous Code Division Multiple Access (TD-SCDMA) communication systems.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). For example, China is pursuing TD-SCDMA as the underlying air interface in the UTRAN architecture with its existing GSM infrastructure as the core network. The UMTS also supports enhanced 3G data communications protocols, such as High Speed Downlink Packet Data (HSDPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

SUMMARY

In an aspect of the disclosure, a method of wireless communications, comprising determining that a first handover from a source cell to a target cell has failed; and performing a second handover from the source cell to a first neighbor cell different from the source cell and from the target cell.

In an aspect of the disclosure, a method of wireless communications, comprising determining that a first handover from a source cell to a target cell has failed; performing a second handover from the source cell to a first neighbor cell different from the source cell and from the target cell by: a) sending a signal to the first neighbor cell and b) receiving a return signal from the first neighbor cell; sending a message to initiate radio resource setup between the first neighbor cell and a radio network controller (RNC); and receiving a connection resetup and a Physical Channel Reconfiguration message from the radio network controller (RNC).

In an aspect of the disclosure, an apparatus for wireless communication, comprising means for determining that a first handover from a source cell to a target cell has failed; and means for performing a second handover from the source cell to a first neighbor cell different from the source cell and from the target cell.

In an aspect of the disclosure, an apparatus of wireless communications, comprising means for determining that a first handover from a source cell to a target cell has failed; means for performing a second handover from the source cell to a first neighbor cell different from the source cell and from the target cell by a) sending a signal to the first neighbor cell and b) receiving a return signal from the first neighbor cell; means for sending a message to initiate radio resource setup between the first neighbor cell and a radio network controller (RNC); and means for receiving a connection resetup and a Physical Channel Reconfiguration message from the radio network controller (RNC).

In an aspect of the disclosure, a computer program product, comprising a computer-readable medium comprising code for determining that a first handover from a source cell to a target cell has failed; and performing a second handover from the source cell to a first neighbor cell different from the source cell and from the target cell.

In an aspect of the disclosure, a computer program product, comprising a computer-readable medium comprising code for determining that a first handover from a source cell to a target cell has failed; performing a second handover from the source cell to a first neighbor cell different from the source cell and from the target cell by a) sending a signal to the first neighbor cell and b) receiving a return signal from the first neighbor cell; sending a message to initiate radio resource setup between the first neighbor cell and a radio network controller (RNC); and receiving a connection resetup and a Physical Channel Reconfiguration message from the radio network controller (RNC).

In an aspect of the disclosure, an apparatus for wireless communication, comprising at least one processor; and a memory coupled to the at least one processor, wherein the at least one processor is configured to determine that a first handover from a source cell to a target cell has failed; and perform a second handover from the source cell to a first neighbor cell different from the source cell and from the target cell.

In an aspect of the disclosure, an apparatus for wireless communication, comprising at least one processor; and a memory coupled to the at least one processor, wherein the at least one processor is configured to determine that a first handover from a source cell to a target cell has failed; perform a second handover from the source cell to a first neighbor cell different from the source cell and from the target cell by a) sending a signal to the first neighbor cell and b) receiving a return signal from the first neighbor cell; send a message to initiate radio resource setup between the first neighbor cell and a radio network controller (RNC); and receive a connection resetup and a Physical Channel Reconfiguration message from the radio network controller (RNC).

Disclosed herein is an apparatus and method for recovery of link failure during handover in TD-SCDMA communication systems. Advantages of the present disclosure may include improved handover reliability in TD-SCDMA communication systems. In particular, a TD-SCDMA communication system may select another neighbor cell for handover which is not the intended target cell to recover from radio link failure and prevent a dropped call during handover.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
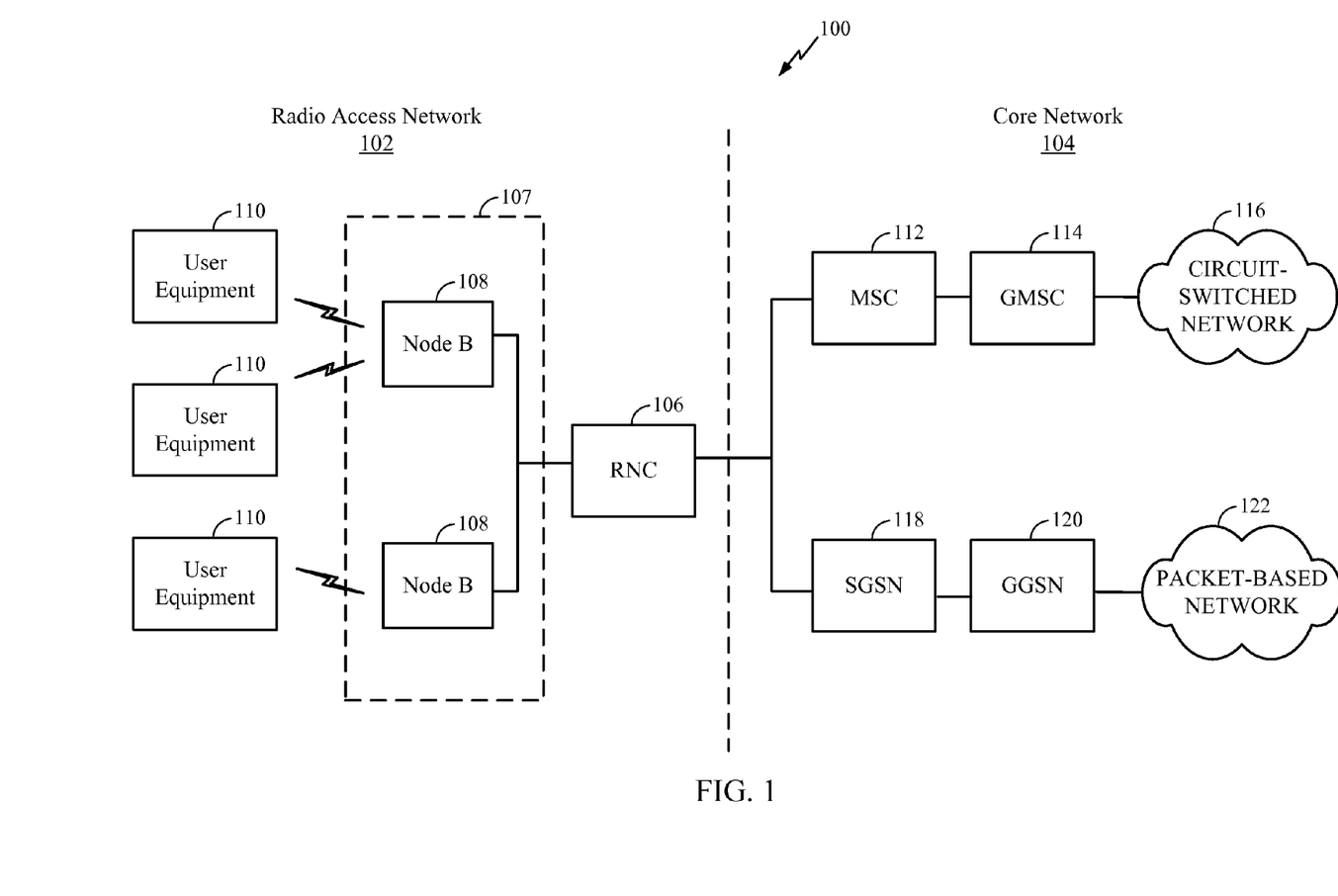
FIG. 1 is a block diagram conceptually illustrating an example of a telecommunications system.

Turning now to FIG. 1, a block diagram is shown illustrating an example of a telecommunications system 100. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a (radio access network) RAN 102 (e.g., UTRAN) that provides various wireless services including telephony, video, data, messaging, broadcasts, and/or other services. The RAN 102 may be divided into a number of Radio Network Subsystems (RNSs) such as an RNS 107, each controlled by a Radio Network Controller (RNC) such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two Node Bs 108 are shown; however, the RNS 107 may include any number of wireless Node Bs. The Node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the Node Bs 108. The downlink (DL), also called the forward link, refers to the communication link from a Node B to a UE, and the uplink (UL), also called the reverse link, refers to the communication link from a UE to a Node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR to determine the UE's location and forwards the call to the particular MSC serving that location.

The core network 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard GSM circuit-switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the uplink (UL) and downlink (DL) between a Node B 108 and a UE 110, but divides uplink and downlink transmissions into different time slots in the carrier.

Figure 2:
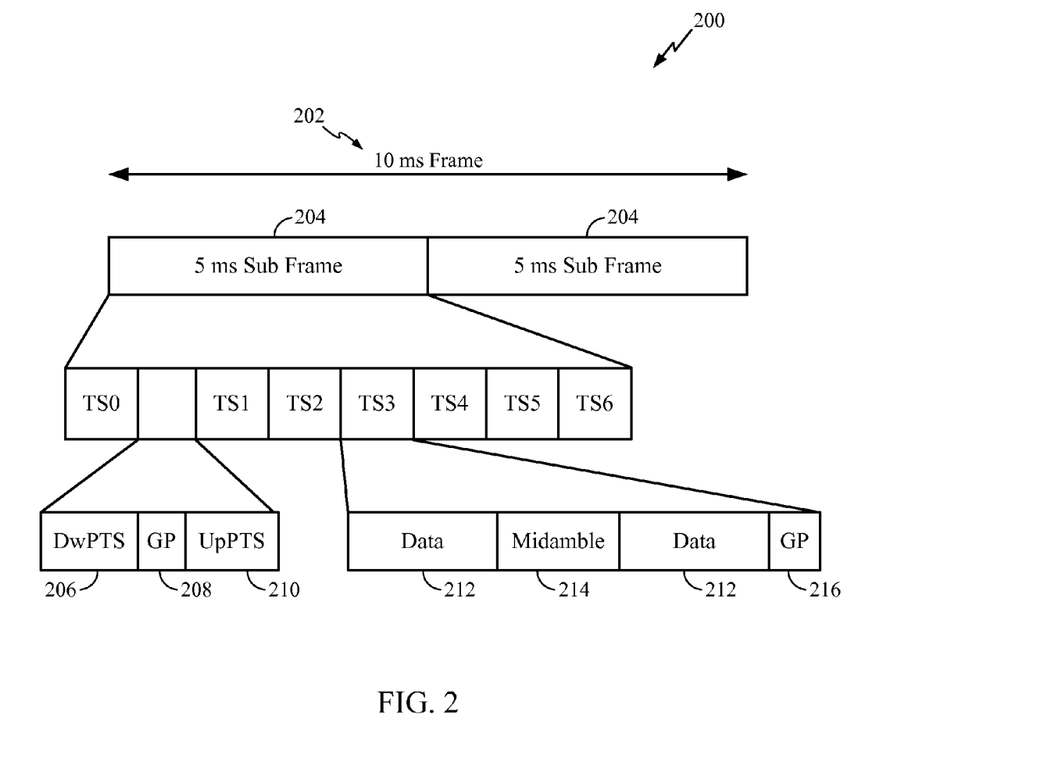
FIG. 2 is a block diagram conceptually illustrating an example of a frame structure in a telecommunications system.

FIG. 2 shows a frame structure 200 for a TD-SCDMA carrier. The TD-SCDMA carrier, as illustrated, has a frame 202 that is 10 ms in length. The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A downlink pilot time slot (DwPTS) 206, a guard period (GP) 208, and an uplink pilot time slot (UpPTS) 210 (also known as the uplink pilot channel (UpPCH)) are located between TS0 and TS1. Each time slot, TS0-TS6, may allow data transmission multiplexed on a maximum of 16 code channels. Data transmission on a code channel includes two data portions 212 separated by a midamble 214 and followed by a guard period (GP) 216. The midamble 214 may be used for features, such as channel estimation, while the GP 216 may be used to avoid inter-burst interference.

Figure 3:
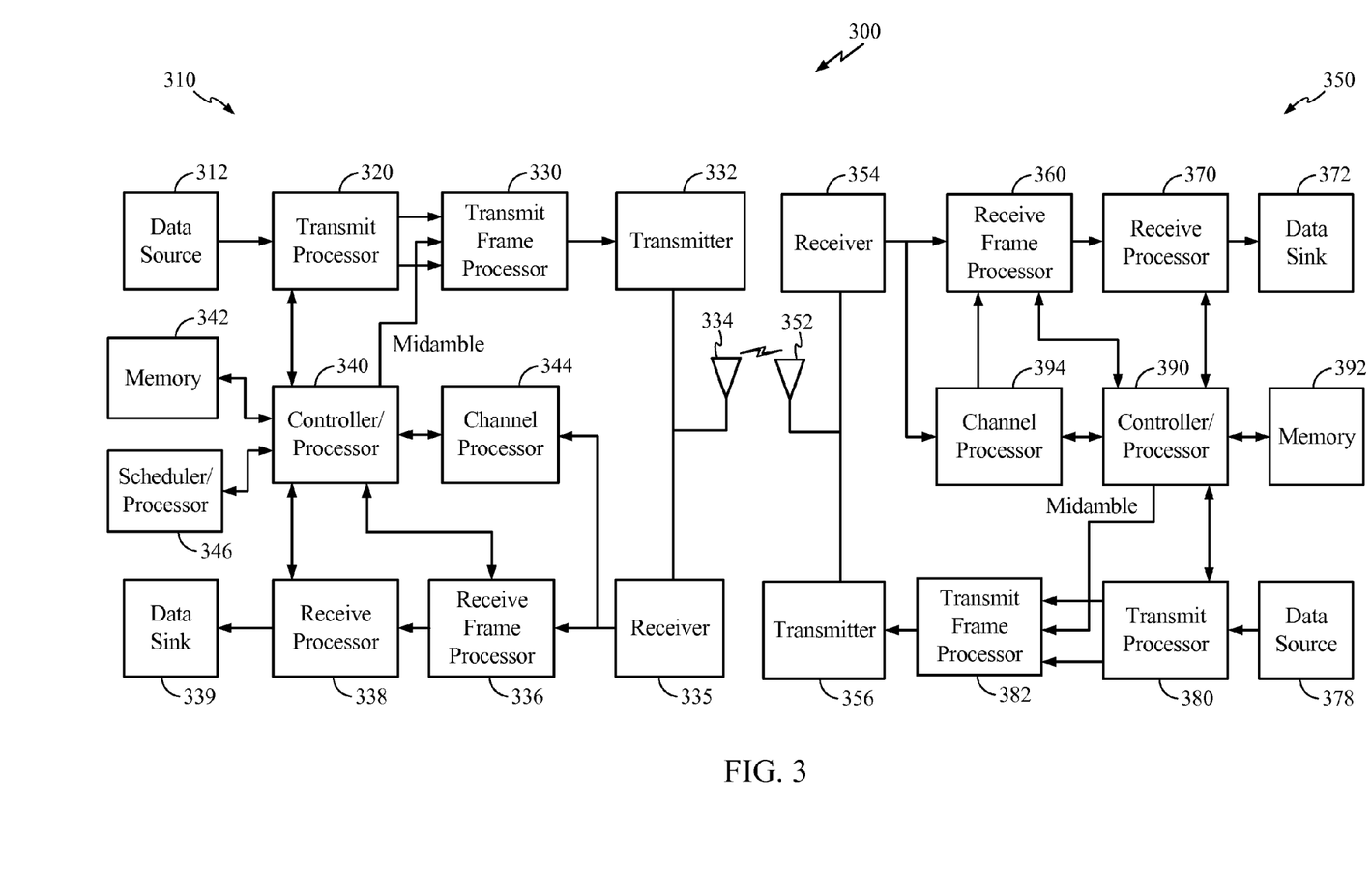
FIG. 3 is a block diagram conceptually illustrating an example of a Node B in communication with a UE in a telecommunications system.

FIG. 3 is a block diagram of a Node B 310 in communication with a UE 350 in a RAN 300, where the RAN 300 may be the RAN 102 in FIG. 1, the Node B 310 may be the Node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the Node B 310. More specifically, the receive processor 370 descrambles and despreads the symbols, and then determines the most likely signal constellation points transmitted by the Node B 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receiver processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard). Similar to the functionality described in connection with the downlink transmission by the Node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the Node B 310 or from feedback contained in the midamble transmitted by the Node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the Node B 310 in a manner similar to that described in connection with the receiver function at the UE 350. A receiver 335 receives the uplink transmission through the antenna 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor, respectively. If some of the frames were unsuccessfully decoded by the receive processor, the controller/processor 340 may also use an acknowledgement (ACK) and/or negative acknowledgement (NACK) protocol to support retransmission requests for those frames.

The controller/processors 340 and 390 may be used to direct the operation at the Node B 310 and the UE 350, respectively. For example, the controller/processors 340 and 390 may provide various functions including timing, peripheral interfaces, voltage regulation, power management, and other control functions. The computer readable media of memories 342 and 392 may store data and software for the Node B 310 and the UE 350, respectively. A scheduler/processor 346 at the Node B 310 may be used to allocate resources to the UEs and schedule downlink and/or uplink transmissions for the UEs.

One important protocol relates to handover. Handover refers to the transfer of connections from one cell, known as the source cell, to another cell, known as the target cell. There are several types of handover, for example, hard handover, soft handover, and baton handover. A hard handover is also known as a "break-before-make" handover, which means that the first connection to the source cell is broken before the second connection to the target cell is made. A soft handover is also known as a "make-before-break" handover, where the first connection is maintained and not broken until the second connection is made. A baton handover is an intermediate case where initial synchronization is performed prior to handover to minimize the transition time. In any event, the RRC standards for TD-SCDMA communication systems currently do not define how to handle handover failure cases, either for baton handover or hard handover.

Figure 4:
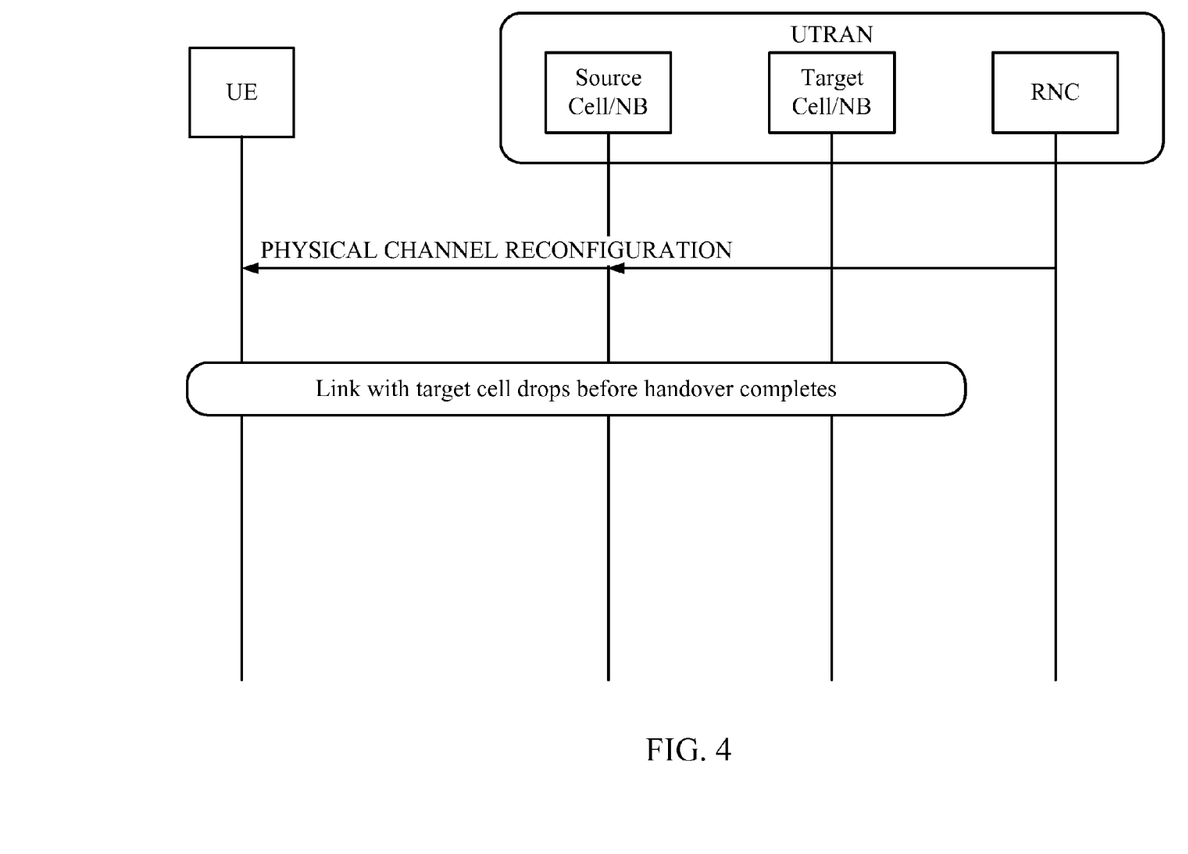
FIG. 4 is a flow diagram conceptually illustrating an example of a user equipment (UE) receiving a PHYSICAL CHANNEL RECONFIGURATION message from a radio access network (RAN).

FIG. 4 is a flow diagram conceptually illustrating an example of a user equipment (UE) receiving a PHYSICAL CHANNEL RECONFIGURATION message from a radio access network (RAN). Subsequently, the UE experiences a link failure. In FIG. 4, the UE receives a PHYSICAL CHANNEL RECONFIGURATION message from the radio access network (RAN) and starts to tune its receiver to the target cell signal from the corresponding target base station. In one example, the RAN is a UTRAN (UMTS Terrestrial Radio Access Network). However, the link with the target cell may be dropped and the UE may lose the radio connection. At the same time, the UE may detect a neighbor cell, distinct from the source or target cell, with adequate signal quality for connection. If the UE can handover to this neighbor cell without management from the RAN, the call can be saved. In this case, the UE maintains the link with the RAN with high probability during the handover failure case.

In one aspect, the present disclosure discloses a procedure for use in a TD-SCDMA communication system wherein a UE can proceed with a handover to a third cell (e.g., neighbor cell) that is not the intended target cell. In accordance with the procedure, some new RRC messages, such as those listed here, may be used in association with the handover to the third cell (e.g., neighbor cell). The names of four new RRC messages shown here are descriptive of the message's functionalities.

31. RRC CONNECTION RESETUP REQUEST
32. RRC CONNECTION RESETUP
33. RRC CONNECTION RESETUP COMPLETE
34. RRC CONNECTION RESETUP FAILURE

In one aspect, the RRC CONNECTION RESETUP message contains the following information:

35. Source cell C-RNTI (cell radio network temporary identity)
36. Target cell C-RNTI
37. Source cell scrambling code
38. Target cell scrambling code The scrambling code and C-RNTI (cell radio network temporary identity) allow the radio network controller (RNC) to determine which UE requested handover failure recovery. Upon receipt of the request message, the RNC can request the neighbor cell which received the RRC CONNECTION RESETUP REQUEST message to set up radio resources to restore the RRC connections for signaling radio bearer. Then the RNC can restore other radio bearers at this neighbor cell using the PHYSICAL CHANNEL RECONFIGURATION message.

Alternatively, the RNC can send a PHYSICAL CHANNEL RECONFIGURATION message to direct the UE to handover to a second neighbor cell. Furthermore, the RNC can send a MEASUREMENT CONTROL message to the UE to receive a MEASUREMENT REPORT message before the RNC directs the UE to handover to the second neighbor cell.

In either handover to a neighbor cell or to a second neighbor cell, the resetup is done with the RNC sending a RRC CONNECTION RESETUP message to the UE with information of physical channel and transport channel configuration at the neighbor cell (or second neighbor cell). The UE then replies with a RRC CONNECTION RESETUP COMPLETE message to indicate that the resetup is now complete.

In one aspect, before the UE can transmit the first RRC message, the UE needs to perform the random access procedure in which the UE sends over the UpPTS (Uplink Pilot Time Slot), a randomly selected SYNC_UL code and receives acknowledgement with timing adjustment and power level command for PRACH (Physical Random Access Channel) over the FPACH (Fast Physical Access Channel).

Figure 5:
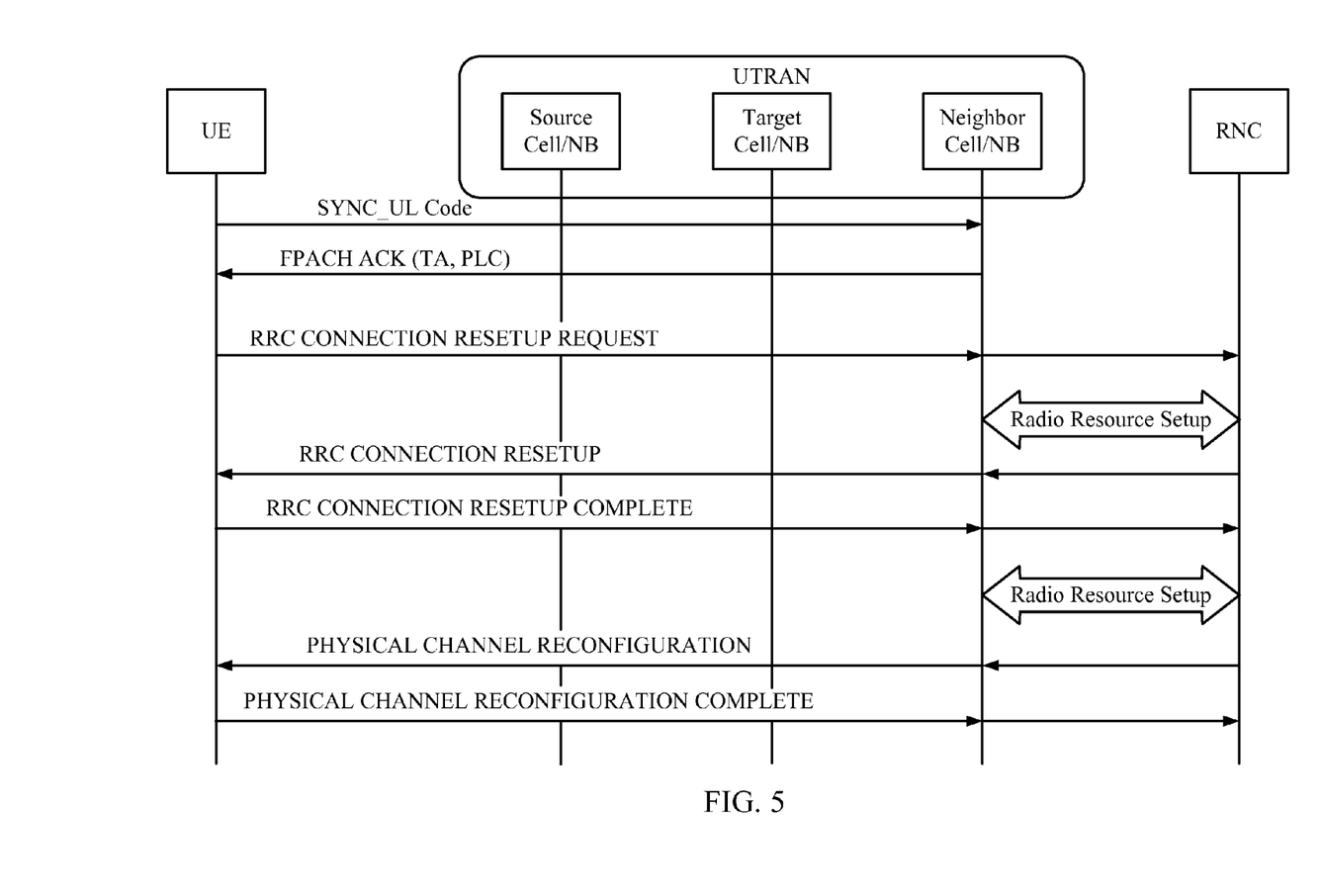
FIG. 5 is a flow diagram conceptually illustrating an example of a handover procedure to a neighbor cell that is not the intended target cell.

FIG. 5 is a flow diagram conceptually illustrating an example of a handover procedure to a neighbor cell that is not the intended target cell. In FIG. 5, the following commands are sent once it is determined that there is a link failure during handover to the intended target cell and that the neighbor cell has good signal quality to provide a link: In one example, the UE sends SYNC_UL Code to the neighbor cell. In reply, the neighbor cell returns to the UE a FPACH ACK (TA, PLC) message. The UE then sends a RRC CONNECTION RESETUP REQUEST through the neighbor cell to the RNC. Radio resource setup occurs upon receipt by the UE of the RRC CONNECTION RESETUP REQUEST. The RNC sends a RRC CONNECTION RESETUP through the neighbor cell to the UE. In reply, the UE sends a RRC CONNECTION RESETUP COMPLETE through the neighbor cell to the RNC. Radio resource setup occurs. The RNC sends a PHYSICAL CHANNEL RECONFIGURATION through the neighbor cell to the UE, and the UE replies with a PHYSICAL CHANNEL RECONFIGURATION COMPLETE through the neighbor cell to the RNC.

Figure 6:
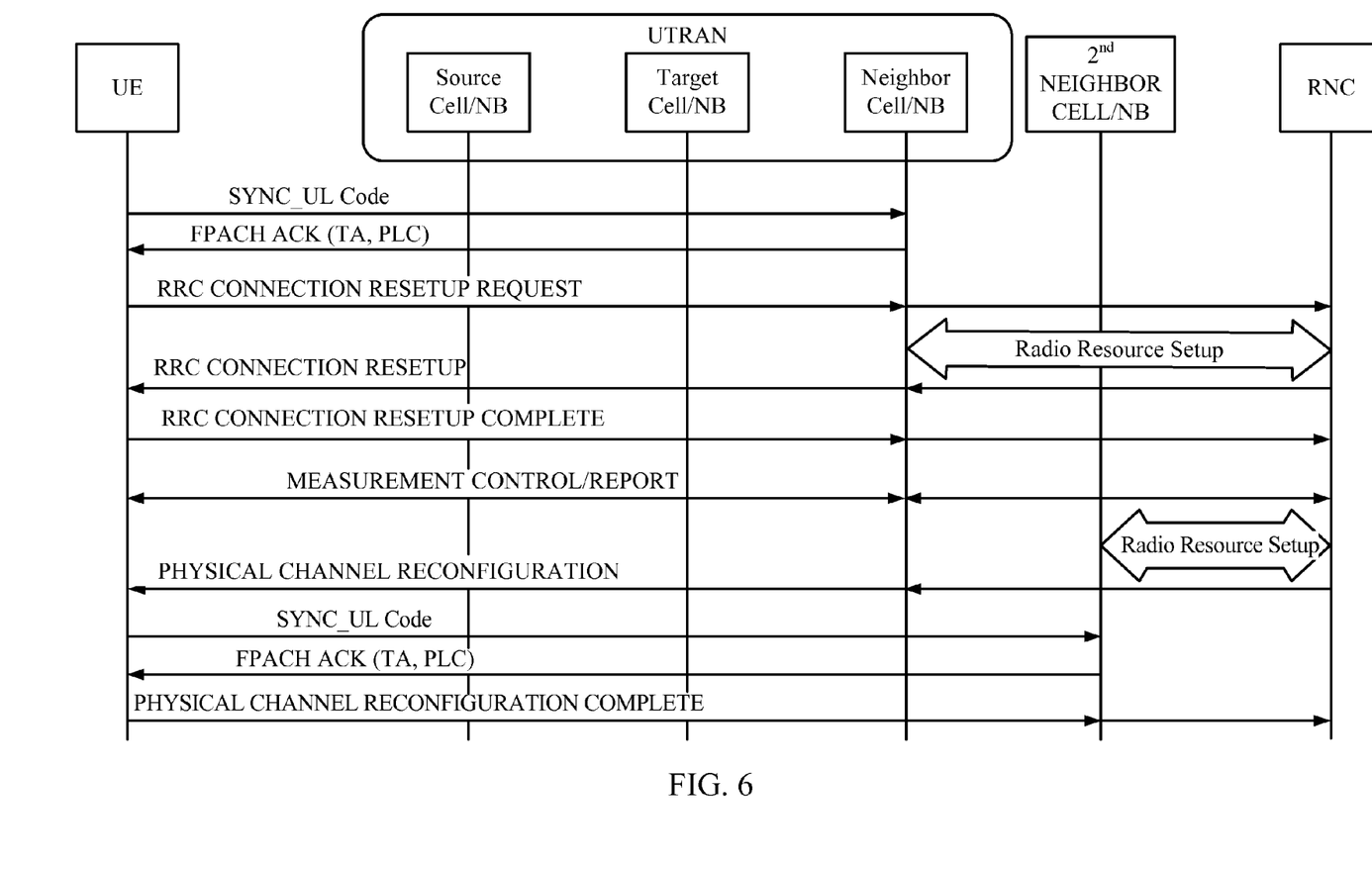
FIG. 6 is a flow diagram conceptually illustrating an example of a handover procedure to a first neighbor cell and subsequently to a second neighbor cell where both the first and second neighbor cells are not the intended target cell.

FIG. 6 is a flow diagram conceptually illustrating an example of a handover procedure to a first neighbor cell and subsequently to a second neighbor cell where both the first and second neighbor cells are not the intended target cell. In FIG. 6, it is determined that the first neighbor cell (a.k.a. neighbor cell/NB) has signal quality that is viable for connection with the UE. The UE sends SYNC_UL Code to the first neighbor cell. In reply, the first neighbor cell returns to the UE a FPACH ACK (TA, PLC) message. The UE then sends a RRC CONNECTION RESETUP REQUEST through the first neighbor cell to the RNC. Radio resource setup between the RNC and the first neighbor cell occurs upon receipt by the UE of the RRC CONNECTION RESETUP REQUEST. The RNC sends a RRC CONNECTION RESETUP through the first neighbor cell to the UE. In reply, the UE sends a RRC CONNECTION RESETUP COMPLETE through the first neighbor cell to the RNC. A MEASUREMENT CONTROL/REPORT is exchanged between the UE and the RNC through the first neighbor cell. Radio resource setup between the RNC and the second neighbor cell occurs. The RNC sends a PHYSICAL CHANNEL RECONFIGURATION through the first neighbor cell to the UE. The UE sends SYNC_UL Code to the second neighbor cell. In reply, the second neighbor cell returns to the UE a FPACH ACK (TA, PLC) message. The UE then sends a PHYSICAL CHANNEL RECONFIGURATION COMPLETE through the second neighbor cell to the RNC.

Figure 7:
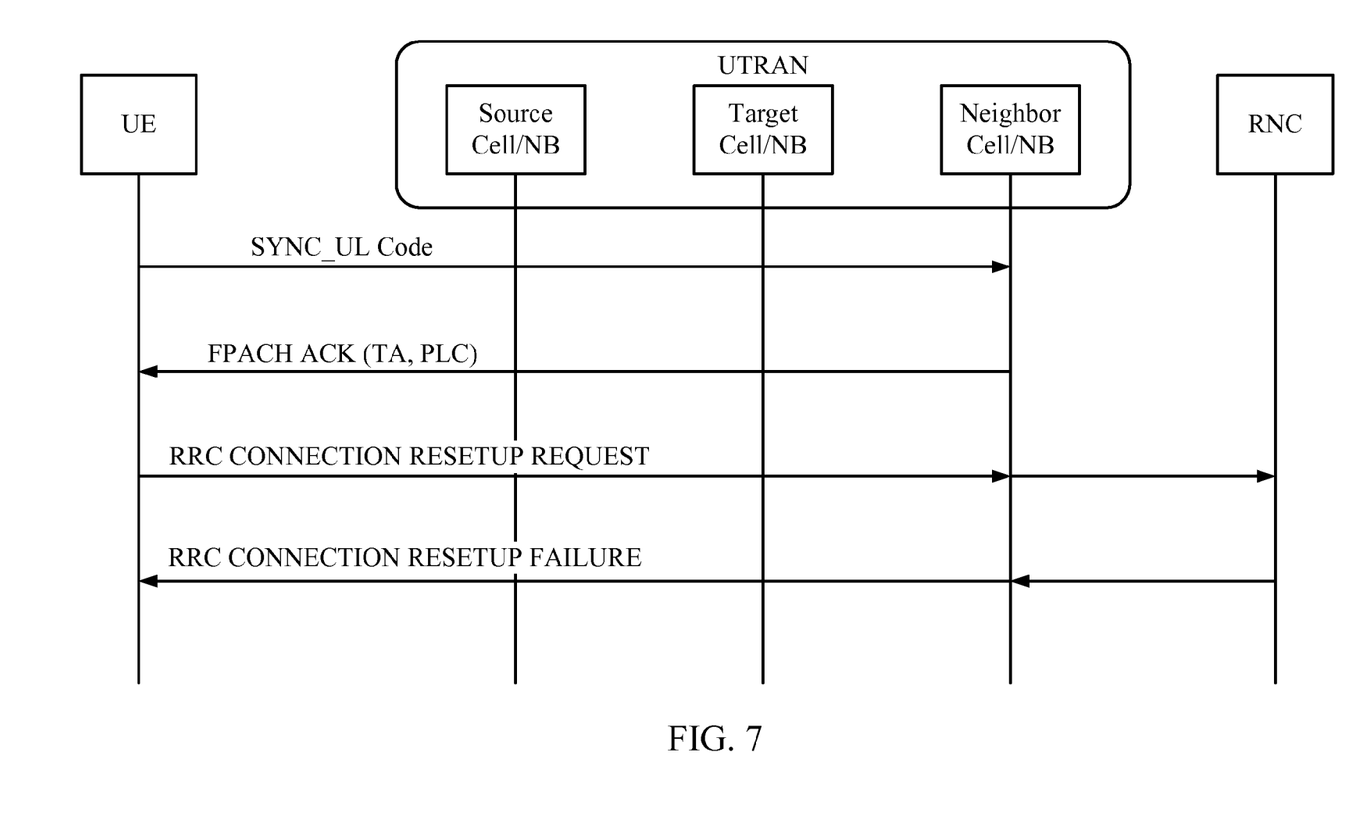
FIG. 7 is a flow diagram conceptually illustrating an example of a reconnection failure.

FIG. 7 is a flow diagram conceptually illustrating an example of a reconnection failure. In some instances, a handover failure recovery effort is not successful. In one example, given the handover failure recovery effort, the RAN (e.g., UTRAN) sends to the UE a RRC CONNECTION RESETUP FAILURE message. And, in response, the UE and RAN release all the logical channels. In one example, all logical channels are released following the reconnection failure. As shown in FIG. 7, the UE sends SYNC_UL Code to the neighbor cell. In reply, the neighbor cell returns to the UE a FPACH ACK (TA, PLC) message. The UE then sends a RRC CONNECTION RESETUP REQUEST through the neighbor cell to the RNC. In reply, the RNC sends a RRC CONNECTION RESETUP FAILURE through the neighbor cell to the UE.

Figure 8:
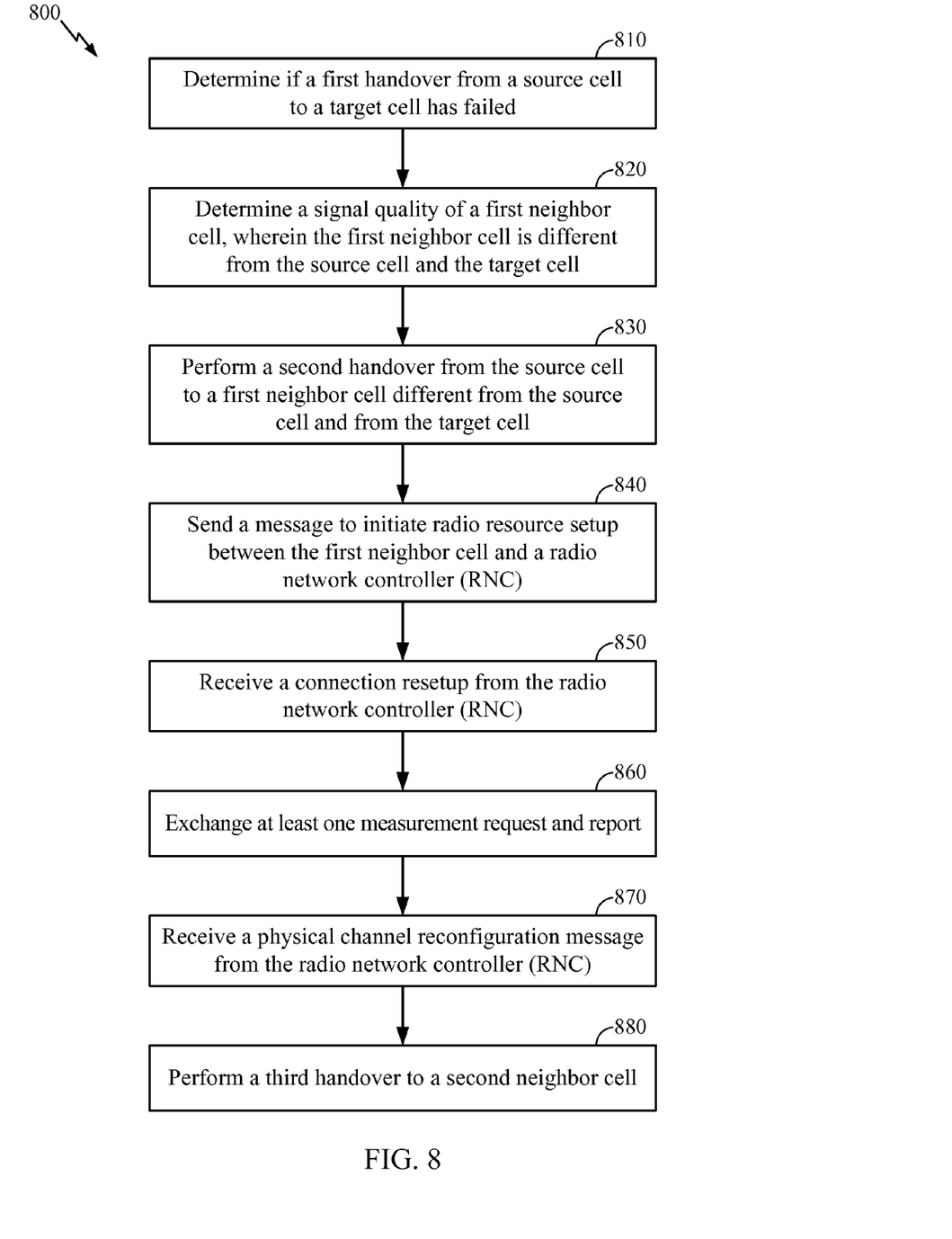
FIG. 8 is a functional block diagram 800 illustrating example blocks executed in conducting wireless communication according to one aspect of the present disclosure.

FIG. 8 is a functional block diagram 800 illustrating example blocks executed in conducting wireless communication according to one aspect of the present disclosure. In block 810, determine if a first handover from a source cell to a target cell has failed. In block 820, determine a signal quality of a first neighbor cell wherein the first neighbor cell is different from the source cell and the target cell. Although written as following the step in block 810, one skilled in the art would understand that the step in block 820 may be performed prior, in parallel or after the step in block 810 without affecting the spirit or scope of the present disclosure. In one example, the signal quality is determined prior to the first handover. In another example, the signal quality is determined after it has been determined that the first handover has failed. In yet another example, the signal quality of the first neighbor cell is determined prior to performing a second handover.

Following block 820, if the first handover has failed, in block 830, perform a second handover from the source cell to a first neighbor cell different from the source cell and from the target cell. In one aspect, the second handover is performed by sending a signal to the first neighbor cell; and receiving a return signal from the first neighbor cell. For example, the signal may be a sync code and the return signal may be an acknowledgement message. Also, in one aspect, the second handover is performed without returning to the source cell first. In one example, the first neighbor cell is selected based on the signal quality of the first neighbor cell. In one example, the second handover is associated with a baton handover.

Furthermore, in block 840, send a message to initiate radio resource setup between the first neighbor cell and a radio network controller (RNC). In one example, the message is a connection resetup request which is sent through the first neighbor cell to the radio network controller (RNC). The connection resetup request is a request for connection resetup. In another example, the message is a connection resetup complete message which is sent through the neighbor cell to the radio network controller (RNC). The connection resetup complete message informs that the connection resetup is completed. In one aspect, the step in block 840 may be executed twice, once where the connection resetup request is sent and another where the connection resetup complete message is sent.

Furthermore, in block 850, receive a connection resetup from the radio network controller (RNC). In an example, where the message sent in block 840 is the connection resetup complete message, then the step of receiving the connection resetup would precede the step in block 840. In one example, the connection resetup includes at least one of the following information: source cell C-RNTI (cell radio network temporary identity), target cell C-RNTI, source cell scrambling code or target cell scrambling code.

Furthermore, in block 860, exchange at least one measurement request and report. In one example, the exchanging of the measurement request and report includes sending a measurement control message to an entity and receiving a measurement report message back from the entity. In one example, the measurement request and report may be exchanged between the radio network controller (RNC) and a user equipment (UE).

Furthermore, in block 870, receive a Physical Channel Reconfiguration message from the radio network controller (RNC). In one example, the Physical Channel Reconfiguration message includes instructions to perform a third handover to a second neighbor cell that is different from the first neighbor cell and from the target cell. In block 880, perform a third handover to the second neighbor cell. In one aspect, the third handover is performed by sending a sync code to the second neighbor cell and receiving an acknowledgement message from the second neighbor cell. In one example, the third handover is performed without returning to the source cell, target cell or first neighbor cell first. And, in one example, the third handover is associated with a baton handover.

In one example, the target cell and the first neighbor cell are part of a UMTS Terrestrial Radio Access Network (UTRAN). And, in one example, the source cell is also part of the UTRAN. In an example, the second neighbor cell is not part of the UTRAN. Furthermore, in one aspect, at least one of the steps of the blocks illustrated in FIG. 8 is executed in compliance with Time Division Synchronous Code Division Multiple Access (TD-SCDMA) protocol.

In one aspect, the example handover procedures illustrated in FIGS. 5, 6, 7 and 8 are executed by the controller/processor 390 of the UE 350 illustrated in FIG. 3. In one example, the execution of the handover procedures may be implemented by the controller/processor 390 in conjunction with one or more of the other components illustrated in FIG. 3.

In one configuration, the UE 350, as illustrated in FIG. 3, for wireless communication includes means for determining if a first handover from a source cell to a target cell has failed; means for determining a signal quality of a first neighbor cell, wherein the first neighbor cell is different from the source cell and the target cell; means for performing a second handover from the source cell to a first neighbor cell different from the source cell and from the target cell; means for sending a message to initiate radio resource setup between the first neighbor cell and a radio network controller (RNC); means for receiving a connection resetup from the radio network controller (RNC); means for exchanging a measurement report; and means for receiving a Physical Channel Reconfiguration message from the radio network controller (RNC).

In one aspect, the aforementioned means may be the controller/processor 390 of the UE 350 illustrated in FIG. 3 configured to perform the functions recited by the aforementioned means. In another aspect, the aforementioned means may be a module or any apparatus configured to perform the functions recited by the aforementioned means.

Several aspects of a telecommunications system has been presented with reference to a TD-SCDMA system. As those skilled in the art will readily appreciate, various aspects described throughout this disclosure may be extended to other telecommunication systems, network architectures and communication standards. By way of example, various aspects may be extended to other UMTS systems such as W-CDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communications, comprising:
    determining, by a user equipment (UE), that a first handover from a source base station to a target base station has failed;
    receiving, by the UE, a connection resetup message in response to determining the first handover has failed;
    performing, by the UE, a second handover from the source base station to a first neighbor base station different from the source base station and from the target base station in response to receiving the connection resetup message; and
    receiving, by the UE, a Physical Channel Reconfiguration message from a radio network controller (RNC), the Physical Channel Reconfiguration message having instructions for performing a third handover to a second neighbor base station that is different from the first neighbor base station and from the target base station, the third handover being performed by sending a sync code to the second neighbor base station and receiving an acknowledgement message from the second neighbor base station.

2. The method of claim 1 wherein the performing the second handover comprises:
sending a signal to the first neighbor base station; and
receiving a return signal from the first neighbor base station.

3. The method of claim 2 wherein the signal is a sync code and the return signal is an acknowledgement message.

4. The method of claim 1 further comprising determining a signal quality of the first neighbor base station prior to performing the second handover.

5. The method of claim 1 further comprising sending a message, by the UE, to the neighbor base station to cause a radio resource setup between the first neighbor base station and the RNC.

6. The method of claim 1 further comprising exchanging at least one measurement request and report between the RNC and the UE.

7. A method of wireless communications, comprising:
determining, by a user equipment (UE), that a first handover from a source base station to a target base station has failed;
performing, by the UE, a second handover from the source base station to a first neighbor base station different from the source base station and from the target base station by:
a. sending a signal to the first neighbor base station; and
b. receiving a return signal from the first neighbor base station;
sending a message, by the UE, to the neighbor base station to cause a radio resource setup between the first neighbor base station and a radio network controller (RNC); and receiving, by the UE, a connection resetup message in response to determining the first handover has failed and a Physical Channel Reconfiguration message from the RNC, the Physical Channel Reconfiguration message having an instruction to perform a third handover to a second neighbor base station that is different from the first neighbor base station and from the target base station, the third handover being performed by sending a sync code to the second neighbor base station and receiving an acknowledgement message from the second neighbor base station.

8. The method of claim 7 further comprising exchanging at least one measurement request and report between the RNC and the UE.

9. The method of claim 8 wherein the third handover is associated with a baton handover.

10. An apparatus for wireless communication, comprising:
means for determining, by a user equipment (UE), that a first handover from a source base station to a target base station has failed;
means for receiving, by the UE, a connection resetup message in response to determining the first handover has failed;
means for performing, by the UE, a second handover from the source base station to a first neighbor base station different from the source base station and from the target base station in response to receiving the connection resetup message; and
means for receiving, by the UE, a Physical Channel Reconfiguration message from a radio network controller (RNC), the Physical Channel Reconfiguration message having instructions for performing a third handover to a second neighbor base station that is different from the first neighbor base station and from the target base station, the third handover being performed by sending a sync code to the second neighbor base station and receiving an acknowledgement message from the second neighbor base station.

11. The apparatus of claim 10 wherein the means for performing the second handover further comprises:
means for sending a signal to the first neighbor base station; and
means for receiving a return signal from the first neighbor base station.

12. The apparatus of claim 11 wherein the signal is a sync code and the return signal is an acknowledgement message.

13. The apparatus of claim 10 further comprising means for determining a signal quality of the first neighbor base station prior to enabling the means for performing the second handover.

14. The apparatus of claim 10 further comprising means for sending a message, by the UE, to the neighbor base station to cause a radio resource setup between the first neighbor base station and the RNC.

15. The apparatus of claim 10 further comprising means for exchanging at least one measurement request and report between the RNC and the UE.

16. An apparatus of wireless communications, comprising:
means for determining, by a user equipment (UE), that a first handover from a source base station to a target base station has failed;
means for performing, by the UE, a second handover from the source base station to a first neighbor base station different from the source base station and from the target base station by:
a. sending a signal to the first neighbor base station; and
b. receiving a return signal from the first neighbor base station;
means for sending a message, by the UE, to the neighbor base station to cause a radio resource setup between the first neighbor base station and a radio network controller (RNC); and
means for receiving, by the UE, a connection resetup message in response to determining the first handover has failed and a Physical Channel Reconfiguration message from the RNC, the Physical Channel Reconfiguration message having an instruction to perform a third handover to a second neighbor base station that is different from the first neighbor base station and from the target base station, the third handover being performed by sending a sync code to the second neighbor base station and receiving an acknowledgement message from the second neighbor base station.

17. The apparatus of claim 16 further comprising means for exchanging at least one measurement request and report between the RNC and the UE.

18. The apparatus of claim 16 wherein the connection resetup includes at least one of the following information: source cell C-RNTI (cell radio network temporary identity), target base station C-RNTI, source base station scrambling code or target base station scrambling code.

19. A computer program product, comprising:
a non-transitory computer-readable medium comprising code for:
determining, by a user equipment (UE), that a first handover from a source base station to a target base station has failed;
receiving, by the UE, a connection resetup message in response to determining the first handover has failed;

performing, by the UE, a second handover from the source base station to a first neighbor base station different from the source base station and from the target base station; and receiving, by the UE, a Physical Channel Reconfiguration message from a radio network controller (RNC), the Physical Channel Reconfiguration message having instructions for performing a third handover to a second neighbor base station that is different from the first neighbor base station and from the target base station, the third handover being performed by sending a sync code to the second neighbor base station and receiving an acknowledgement message from the second neighbor base station.

20. A computer program product, comprising:
a non-transitory computer-readable medium comprising code for:
determining, by a user equipment (UE), that a first handover from a source base station to a target base station has failed;
performing, by the UE, a second handover from the source base station to a first neighbor base station different from the source base station and from the target base station by:
  a. sending a signal to the first neighbor base station; and
  b. receiving a return signal from the first neighbor base station;
sending a message, by the UE, to the neighbor base station to cause a radio resource setup between the first neighbor base station and a radio network controller (RNC); and
receiving, by the UE, a connection resetup message in response to determining the first handover has failed and a Physical Channel Reconfiguration message from the RNC, the Physical Channel Reconfiguration message having an instruction to perform a third handover to a second neighbor base station that is different from the first neighbor base station and from the target base station, the third handover being performed by sending a sync code to the second neighbor base station and receiving an acknowledgement message from the second neighbor base station.

21. An apparatus for wireless communication, comprising:
at least one processor; and
a memory coupled to the at least one processor,
wherein the at least one processor is configured to:
determine, by a user equipment (UE), that a first handover from a source base station to a target base station has failed;
receive, by the UE, a connection resetup message in response to determining the first handover has failed;
perform, by the UE, a second handover from the source base station to a first neighbor base station different from the source base station and from the target base station in response to receiving the connection resetup message; and
receive, by the UE, a Physical Channel Reconfiguration message from a radio network controller (RNC), the Physical Channel Reconfiguration message having instructions for performing a third handover to a second neighbor base station that is different from the first neighbor base station and from the target base station, the third handover being performed by sending a sync code to the second neighbor base station and receiving an acknowledgement message from the second neighbor base station.

22. The apparatus of claim 21 wherein the at least one processor is further configured to:
send a signal to the first neighbor base station; and
receive a return signal from the first neighbor base station.

23. The apparatus of claim 22 wherein the signal is a sync code and the return signal is an acknowledgement message.

24. The apparatus of claim 21 wherein the at least one processor is further configured to determine a signal quality of the first neighbor base station prior to performing the second handover.

25. The apparatus of claim 21 wherein the at least one processor is further configured to send a message, by the UE, to the neighbor base station to cause a radio resource setup between the first neighbor cell and the RNC.

26. The apparatus of claim 21 wherein the at least one processor is further configured to exchange at least one measurement request and report between the RNC and the UE.

27. An apparatus for wireless communication, comprising:
at least one processor; and
a memory coupled to the at least one processor,
wherein the at least one processor is configured to:
determine, by the user equipment (UE), that a first handover from a source base station to a target base station has failed;
perform, by the UE, a second handover from the source base station to a first neighbor cell of a neighbor base station different from the source base station and from the target base station by:
  a. sending a signal to the first neighbor base station; and
  b. receiving a return signal from the first neighbor base station;
send a message, by the UE, to the neighbor base station to cause a radio resource setup between the first neighbor base station and a radio network controller (RNC); and
receive a connection resetup message in response to determining the first handover has failed and a Physical Channel Reconfiguration message from the RNC, the Physical Channel Reconfiguration message having an instruction to perform a third handover to a second neighbor base station that is different from the first neighbor base station and from the target base station, the third handover being performed by sending a sync code to the second neighbor base station and receiving an acknowledgement message from the second neighbor base station.

28. The apparatus of claim 27 wherein the at least one processor is further configured to exchange measurement request and report between the RNC and the UE.

* * * * *